United States Patent
Tu et al.

(10) Patent No.: US 9,461,497 B2
(45) Date of Patent: Oct. 4, 2016

(54) CHARGE DEVICE AND SYSTEM

(71) Applicant: LEADING TECH-SEMICONDUCTOR Co., LTD, Hsinchu County (TW)

(72) Inventors: Chia-Hao Tu, Keelung (TW); Ning Sung Chou, Hsinchu County (TW)

(73) Assignee: Leading Tech-Semiconductor Co., Ltd., Hsinchu County (TW)

( * ) Notice: Subject to any disclaimer, the term of this patent is extended or adjusted under 35 U.S.C. 154(b) by 170 days.

(21) Appl. No.: 14/591,889

(22) Filed: Jan. 7, 2015

(65) Prior Publication Data

US 2015/0194824 A1    Jul. 9, 2015

Related U.S. Application Data

(63) Continuation of application No. 61/924,896, filed on Jan. 8, 2014.

(30) Foreign Application Priority Data

Dec. 12, 2014   (TW) .............................. 103143430 A

(51) Int. Cl.
*H02J 7/00*          (2006.01)
(52) U.S. Cl.
CPC .............. *H02J 7/007* (2013.01); *H02J 7/0054* (2013.01); *H02J 2007/0059* (2013.01); *H02J 2007/0062* (2013.01)

(58) Field of Classification Search
CPC ................ H02J 2007/0059; H02J 2007/0062; H02J 7/0054; H02J 7/007
See application file for complete search history.

(56) References Cited

U.S. PATENT DOCUMENTS

| | | | | |
|---|---|---|---|---|
| 2008/0238356 | A1* | 10/2008 | Batson .................. | H02J 7/0045 320/103 |
| 2012/0104994 | A1* | 5/2012 | Esnard-Domerego | H02J 7/0068 320/107 |

* cited by examiner

*Primary Examiner* — Vuthe Siek

(57) ABSTRACT

A charge device coupled to an external device is provided. A connection port is configured to couple to the external device and includes a first pin and a second pin. A battery unit has a battery voltage. A conversion unit converts the battery voltage to provide power to the external device. When the battery voltage is higher than a threshold value, a detection control unit directs the first and second pins to couple to a first charge unit and the connection port outputs a first charge current to the external device. When the battery voltage is not higher than the threshold value, the detection control unit directs the first and second pins to couple to a second charge unit and the connection port outputs a second charge current to the external device. The first charge current is greater than the second charge current.

20 Claims, 6 Drawing Sheets

US 9,461,497 B2

CHARGE DEVICE AND SYSTEM

CROSS REFERENCE TO RELATED APPLICATIONS

This application claims the benefit of U.S. Provisional Application No. 61/924,896, filed on Jan. 8, 2014, and Taiwan Patent Application No. 103143430, filed on Dec. 12, 2014, which are hereby incorporated by reference in their entirety.

BACKGROUND OF THE INVENTION

1. Field of the Invention

The invention relates to a charge device, and more particularly to a charge device that provides different charge current.

2. Description of the Related Art

As technology develops, new types of electronic device are being developed.

To increase convenience, various electronic devices are designed to be portable. Each portable devices comprises a rechargeable battery to provide power to the elements of the device. When the charge on the rechargeable battery is not low, the electronic device cannot work normally. Therefore, the rechargeable battery requires charging to ensure that the electronic device works normally.

BRIEF SUMMARY OF THE INVENTION

In accordance with an embodiment, a charge device is coupled to an external device and comprises a connection port, a battery unit, a conversion unit and a detection control unit. The connection port is configured to couple to the external device and comprises a first pin and a second pin. The battery unit has a battery voltage. The conversion unit converts the battery voltage to provide power to the external device. The detection control unit directs the first and second pins to couple to a first charge unit when the battery voltage is higher than a threshold value. The detection control unit directs the first and second pins to couple to a second charge unit when the battery voltage is not higher than the threshold value. When the first and second pins are coupled to the first charge unit, the connection port outputs a first charge current to the external device. When the first and second pins are coupled to the second charge unit, the connection port outputs a second charge current to the external device. The first charge current is greater than the second charge current.

In accordance with another embodiment, a charge system comprises a charge device and an external device. The charge device provides a first charge current or a second charge current and comprises a connection port, a battery unit, a conversion unit and a detection control unit. The connection port comprises a first pin and a second pin. The battery unit has a battery voltage. The conversion unit converts the battery voltage. The detection control unit directs the first and second pins to couple to a first charge unit when the battery voltage is higher than a threshold value. The detection control unit directs the first and second pins to couple to a second charge unit when the battery voltage is not higher than the threshold value. When the first and second pins are coupled to the first charge unit, the connection port outputs the first charge current. When the first and second pins are coupled to the second charge unit, the connection port outputs the second charge current. The first charge current is greater than the second charge current. The external device is coupled to the connection port to receive the first or second charge current.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
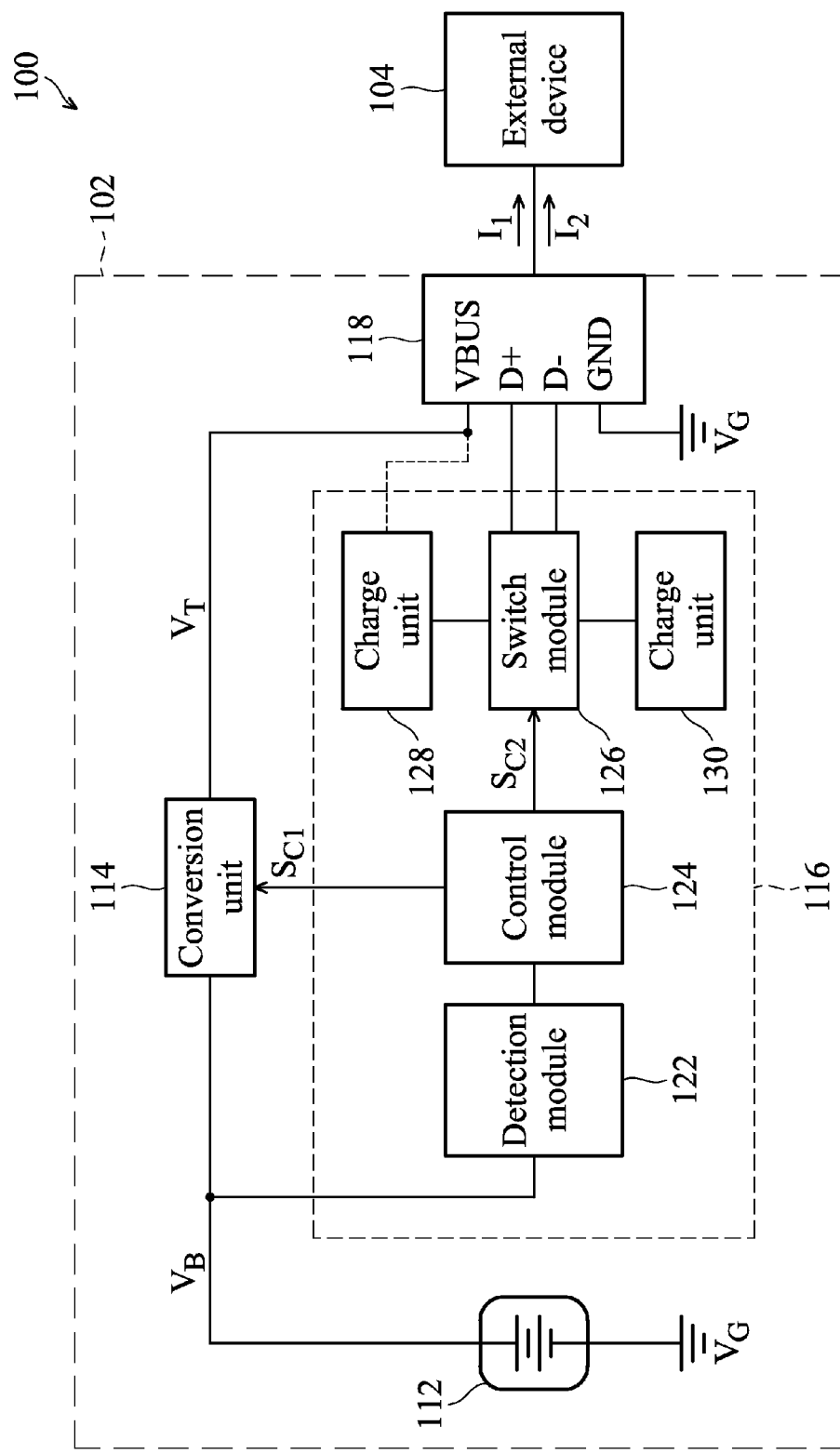
FIG. 1 is a schematic diagram of an exemplary embodiment of a charge system, in accordance with some embodiments.

FIG. 1 is a schematic diagram of an exemplary embodiment of a charge system, in accordance with some embodiments. As shown in FIG. 1, the charge system 100 comprises a charge device 102 and an external device 104. The charge device 102 outputs a first charge current or a second charge current according to the voltage of a battery disposed in the charge device 102 to charge the external device 104. In one embodiment, the charge device 102 is a mobile bank.

When the battery voltage of the charge device 102 stores enough energy, the charge device 102 provides a large charge current. When the battery voltage of the charge device 102 does not store enough energy, the charge device 102 outputs a small charge current. For example, when the battery voltage of the charge device 102 is higher than a threshold value, the charge device 102 outputs a first charge current $I_1$, and when the battery voltage of the charge device 102 is not higher than the threshold value, the charge device 102 outputs a second charge current $I_2$. The first charge current $I_1$ is larger than the second charge current $I_2$.

In this embodiment, the charge device 102 comprises a battery unit 112, a conversion unit 114, a detection control unit 116 and a connection port 118. The connection port 118 is configured to couple to the external device 104 and comprises various pins. In this embodiment, the connection port 118 is a USB port and comprises pins VBUS, D+, D– and GND. The pin VBUS transmits a charge voltage $V_T$. The pin GND transmits a ground voltage $V_G$. The invention does not limit the kind of connection port 118 that can be used. Any connection device can serve as the connection port 118, as long as the connection device is capable of transmitting power to the external device 104.

The battery unit 112 provides a battery voltage $V_B$. The invention does not limit the structure of battery unit 112. In one embodiment, the battery unit 112 comprises at least one rechargeable battery. When the battery unit 112 comprises more rechargeable batteries, the rechargeable batteries are connected to each other in series or in parallel. The invention does not limit the kind of rechargeable battery that can be used. Any device can serve as the rechargeable battery, as long as the device is capable of storing and discharging power.

The conversion unit 114 converts the battery voltage $V_B$ to generate a charge voltage $V_T$ and provides the charge voltage $V_T$ to the external device 104 via the pin VBUS of the connection port 118. In one embodiment, the conversion unit 114 is a boost circuit or a buck circuit. In this embodiment, the conversion unit 114 performs a voltage conversion operation according to a control signal $S_{C1}$. For example, when the control signal $S_{C1}$ is asserted, the conversion unit 114 converts the battery voltage $V_B$, and when the control signal $S_{C1}$ is de-asserted, the conversion unit 114 stops converting the battery voltage $V_B$.

The detection control unit 116 controls the connection state between the pins D+ and D− of the connection port 118. In this embodiment, the detection control unit 116 comprises a detection module 122, a control module 124, a switch module 126, and charge units 128 and 130.

The detection module 122 detects the battery voltage $V_B$. The invention does not limit the internal circuit structure of the detection module 122. Any circuit can serve as the detection module 122, as long as the circuit is capable of detecting voltage. In one embodiment, the detection module 122 is a voltage detector. In another embodiment, the detection module 122 is a voltage comparator to determine whether the battery voltage $V_B$ is higher than a threshold value.

The control module 124 generates control signals $S_{C1}$ and $S_{C2}$ according to the detection result generated by the detection module 122. In one embodiment, if the detection module 122 is just a voltage detector, the control module 124 has a voltage-compare function to determine whether the detection result generated by the detection module 122 is higher than a threshold value. In another embodiment, if the detection module 122 is a voltage comparator, the control module 124 can directly utilize the compared result generated by the voltage comparator to generate the control signals $S_{C1}$ and $S_{C2}$.

In one embodiment, when the battery voltage $V_B$ is higher than a threshold value, the control module 124 asserts the control signal $S_{C1}$ to direct the conversion unit 114 to convert the battery voltage $V_B$. In another embodiment, when the battery voltage $V_B$ is not higher than the threshold value, the control module 124 still asserts the control signal $S_{C1}$ or first momentarily de-asserts the control signal $S_{C1}$ and then asserts the control signal $S_{C1}$. In other embodiments, when the battery voltage $V_B$ is not higher than the threshold value and is lower than a limiting value, it means that the voltage of the battery unit 112 is at a minimum. Therefore, the control module 124 de-asserts the control signal $S_{C1}$ to stop converting the battery voltage $V_B$.

In this embodiment, the control module 124 changes the connection state between the pins D+ and D− of the connection port 118 according to the battery voltage $V_B$. The external device 104 operates in a fast charge mode or in a slow charge mode according to the connection state between the pins D+ and D− of the connection port 118. In the fast charge mode, the external device 104 captures a larger charge current from the charge device 102. In the slow charge mode, the external device 104 captures a small charge current from the charge device 102.

The switch module 126 directs the pins D+ and D− to connect to the charge unit 128 or 130 according to the control signal $S_{C2}$. In this embodiment, when the battery voltage $V_B$ is higher than a threshold value, the switch module 126 directs the pins D+ and D− to connect to the charge unit 128. Therefore, the external device 104 enters in a fast charge mode. When the battery voltage $V_B$ is not higher than the threshold value, the switch module 126 directs the pins D+ and D− to connect to the charge unit 130. Therefore, the external device 104 enters a slow charge mode.

In one embodiment, when the pins D+ and D− are coupled to the charge unit 128, the connection port 118 outputs the charge current $I_1$. When the pins D+ and D− are coupled to the charge unit 130, the connection port 118 outputs the charge current $I_2$. In this embodiment, the charge current $I_2$ is smaller than the charge current I.

Figure 2B:
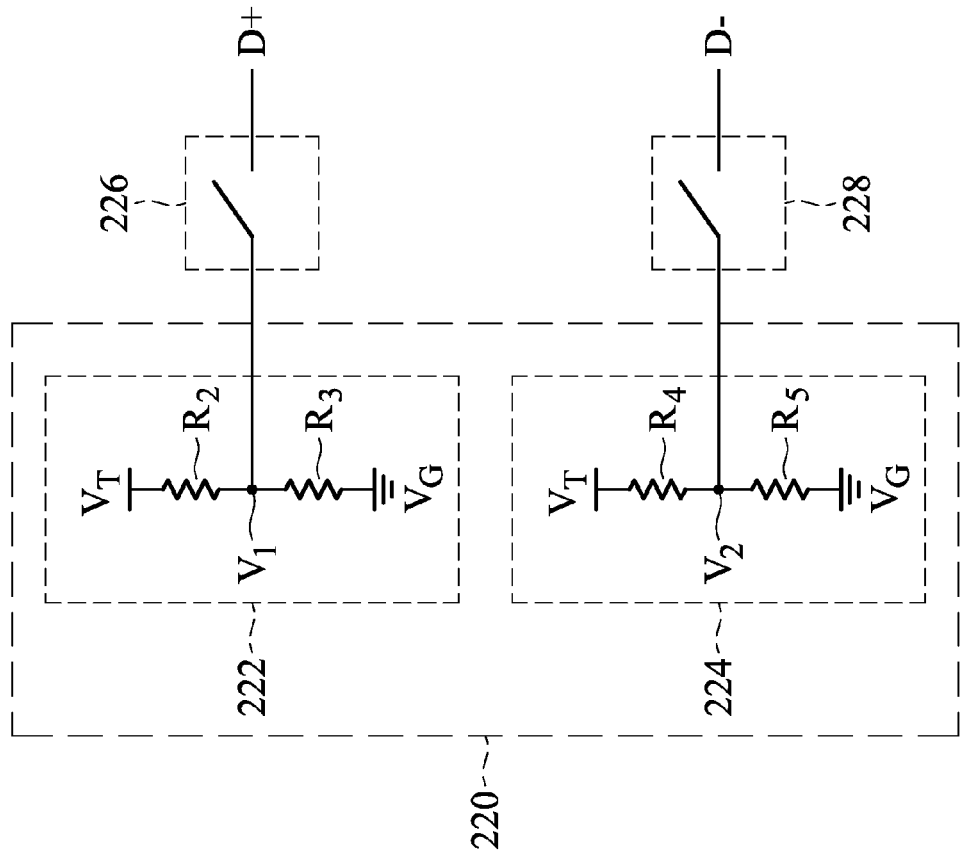
FIGS. 2A~2C and 3 are schematic diagrams of exemplary embodiments of a charge unit, in accordance with some embodiments.
Figure 2A:
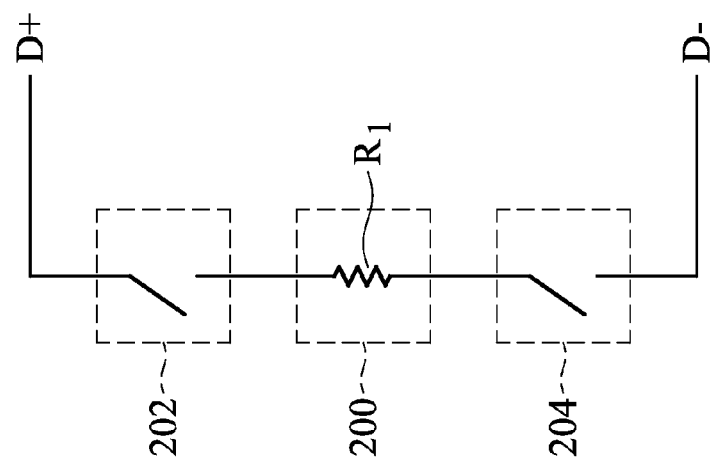

FIG. 2A is a schematic diagram of an exemplary embodiment of a charge unit, in accordance with some embodiments. As shown in FIG. 2A, the charge unit 200 is a resistor $R_1$. The resistor $R_1$ is configured between the pin D+ and the pin D−. In this embodiment, the switch module 126 comprises switches 202 and 204. When the battery voltage $V_B$ is higher than a threshold value, the switches 202 and 204 are turned on. Therefore, the pin D+ is connected to the pin D−. When the battery voltage $V_B$ is not higher than the threshold value, the switches 202 and 204 are turned off. Thus, the pin D+ is not connected to the pin D−. In one embodiment, the control module 124 turns on or off the switches 202 and 204.

FIG. 2B is a schematic diagram of another exemplary embodiment of a charge unit, in accordance with some embodiments. The charge unit 220 comprises charge modules 222 and 224. The charge module 222 performs a first operation for the charge voltage $V_T$ to generate a voltage $V_1$. The charge module 224 performs a second operation for the charge voltage $V_T$ to generate a voltage $V_2$. In this embodiment, the processing degree of the charge module 222 is different from that of the charge module 224. Therefore, the voltage $V_1$ is different from the voltage $V_2$. In other embodiments, the charge modules 222 and 224 process the battery voltage $V_B$. The processing degree of the charge module 222 is different from that of the charge module 224. Therefore, the processed results generated by the charge modules 222 and 224 are different.

In this embodiment, the charge module 222 comprises resistors $R_2$ and $R_3$. The resistors $R_2$ and $R_3$ are serially connected between the charge voltage $V_T$ and the ground voltage $V_G$ to divide the charge voltage $V_T$. In other embodiments, the charge module 222 is a voltage source to provide a voltage, such as $V_1$, to the pin D+.

Additionally, the charge module 224 comprises resistors $R_4$ and $R_5$. The resistors $R_4$ and $R_5$ are serially connected between the charge voltage $V_T$ and the ground voltage $V_G$ to divide the charge voltage $V_T$. In some embodiments, the charge module 224 can be a voltage source to provide a voltage, such as $V_2$, to the pin D−.

When the battery voltage $V_B$ is higher than a threshold value, the control module 124 turns on the switch 226 to provide voltage $V_1$ to the pin D+ and turns on the switch 228 to provide voltage $V_2$ to the pin D−. When the battery voltage $V_B$ is not higher than the threshold value, the control module 124 turns off the switches 226 and 228 to stop providing voltages $V_1$ and $V_2$ to the pins D+ and D−.

In this embodiment, since the connection port 118 is a USB connection port, two voltages (e.g. $V_1$ and $V_2$) are provided to two pins (e.g. D+ and D−). In another embodiment, if the connection port 118 is another kind of connection port, only one voltage (e.g. $V_1$ or $V_2$) is provided to one pin of the connection port 118. In some embodiments, three or more voltages are provided to three or more pins of the connection port 118.

Figure 2C:
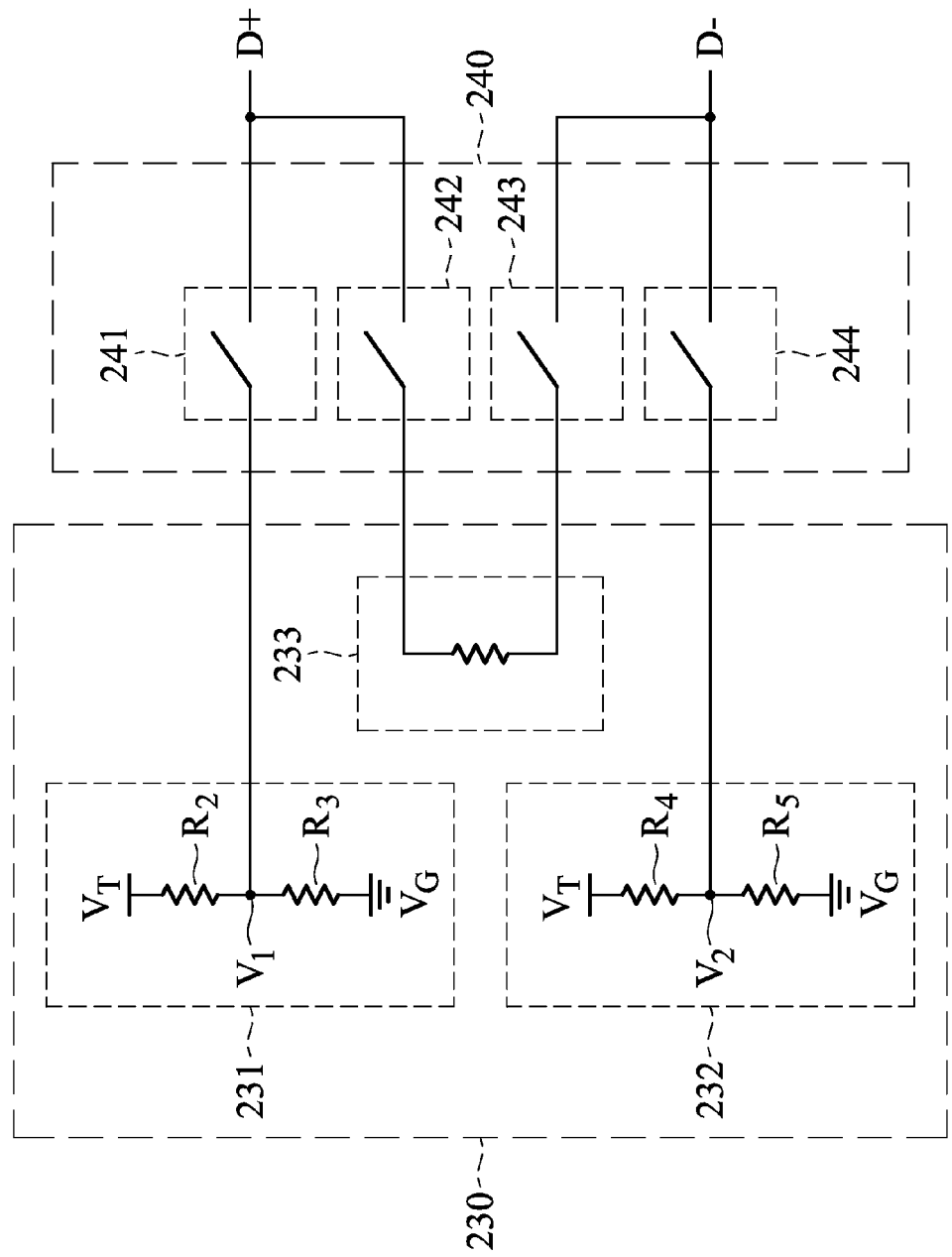

FIG. 2C is a schematic diagram of an exemplary embodiment of a charge unit, in accordance with some embodiments. As shown in FIG. 2C, the charge unit 230 comprises charge modules 231~233. Additionally, the switch module 240 comprises switches 241~244. The charge module 231 processes the charge voltage $V_T$ to generate the voltage $V_1$. The charge module 232 processes the charge voltage $V_T$ to generate the voltage $V_2$. The charge module 233 is connected between the pins D+ and D−. In some embodiments, the charge modules 231 and 232 process the battery voltage $V_B$.

When the battery voltage $V_B$ is higher than a threshold value, the control module 124 controls the switches 241~244 according to the voltage levels of the pins D+ and D−. In one embodiment, the control module 124 first turns on the switches 241 and 244 to provide voltages $V_1$ and $V_2$ to the pins D+ and D− and determines whether the voltage levels of the pins D+ and D− are changed.

When the external device 104 is coupled to the connection port 118 and does not change the voltage levels of the pins D+ and D−, it means that the voltage levels of the pins D+ and D− conform to a pre-determined state. Therefore, the control module 124 still turns on the switches 241 and 244 such that the pins D+ and D− are coupled to the charge modules 231 and 232. When the voltage levels of the pins D+ and D− are changed and does not conform to the pre-determined state, the control module 124 turns on the switches 242 and 243 such that the pin D+ is connected to the pin D−.

Figure 3:
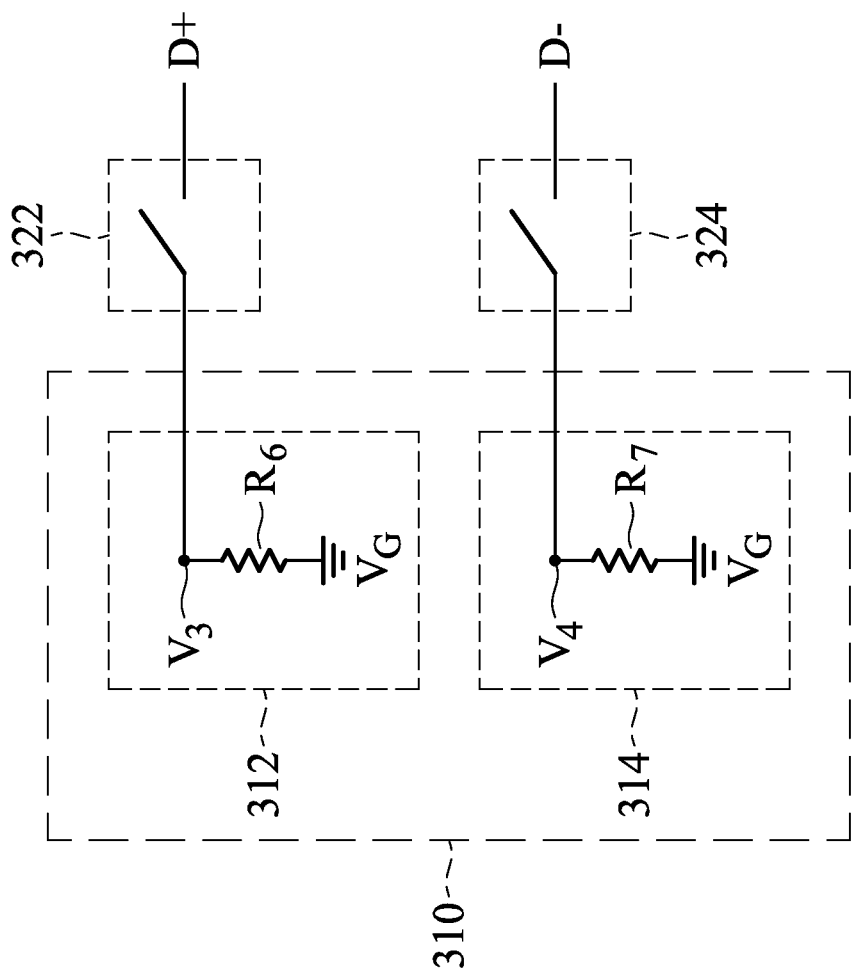

FIG. 3 is a schematic diagram of an exemplary embodiment of a charge unit, in accordance with some embodiments. In this embodiment, the charge unit 310 comprises charge modules 312 and 314. The charge module 312 provides the voltage $V_3$. The charge module 314 provides the voltage $V_4$. In this embodiment, the charge module 312 is a resistor $R_6$ and the charge module 312 receives the ground voltage $V_G$ to generate the voltage $V_3$. Furthermore, the charge module 314 is a resistor $R_7$ and the charge module 314 receives the ground voltage $V_G$ to generate the voltage $V_4$. In one embodiment, the voltages $V_3$ and $V_4$ are both the same and are within a range of 0V and 5V.

When the battery voltage $V_B$ is not higher than a threshold value, the control module 124 turns on the switches 322 and 324 to provide voltage $V_3$ to the pin D+ and provide voltage $V_4$ to the pin D−. The external device 104 operates in a slow charge mode according to the voltage levels of the pins D+ and D−. In this mode, the charge device 102 provides a small charge current (e.g. $I_2$) to the external device 104.

However, when the battery voltage $V_B$ is higher than the threshold voltage, the control module 124 turns off the switches 322 and 324. In one embodiment, the control module 124 turns on the switches 202 and 204 shown in FIG. 2A or the switches 226 and 228 shown in FIG. 2B. Therefore, the external device 104 operates in a fast charge mode. In this mode, the charge device 102 provides a large charge current, such as $I_1$.

Figure 4:
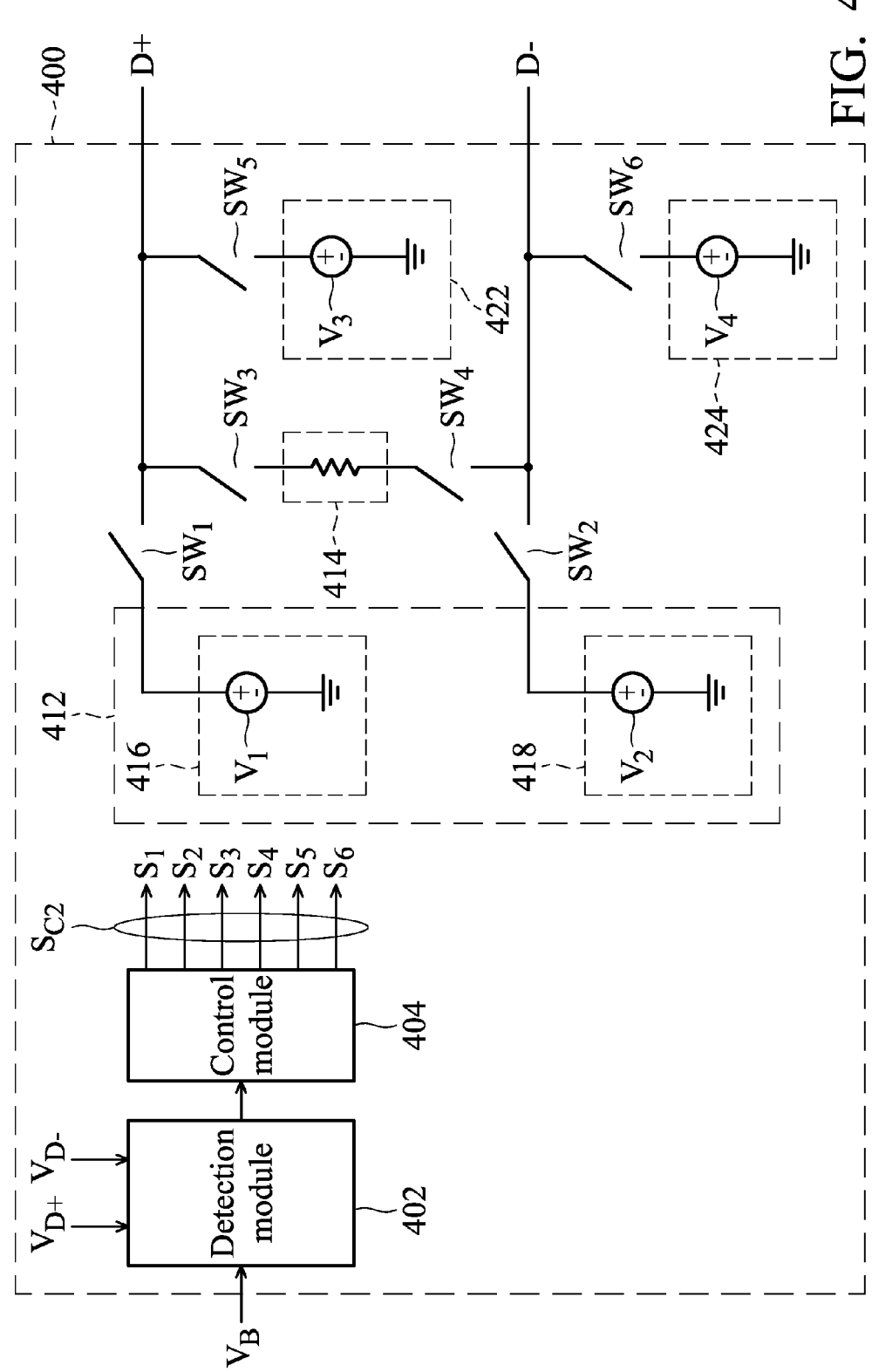
FIG. 4 is a schematic diagram of an exemplary embodiment of a detection control unit, in accordance with some embodiments.

FIG. 4 is a schematic diagram of an exemplary embodiment of a detection control unit, in accordance with some embodiments. In this embodiment, the detection control unit 400 comprises a detection module 402, a control module 404, charge units 412, 414, 422 and 424, and switches $SW_1 \sim SW_6$. The charge unit 412 comprises charge modules 416 and 418. Since the operation of the detection module 402 is the same as the detection module 122 shown in FIG. 1, the description of the detection module 402 is omitted.

The control module 404 generates the control signal $S_{C2}$ according to the detection result generated by the detection module 402. In this embodiment, the control signal $S_{C2}$ comprises control components $S_1 \sim S_6$ to control the switches $SW_1 \sim SW_6$ respectively. The invention does not limit the number of control components that can be used. In one embodiment, the number of control components is related to the kind of switches $SW_1 \sim SW_6$. For example, if the switch $SW_1$ is an N-type transistor and the switch $SW_3$ is a P-type transistor, the control module 404 only utilizes a single control component to turn on the switch $SW_1$ or $SW_3$. If the switches $SW_1$ and $SW_3$ are N-type or P-type transistors, the control module 404 needs to utilize two control components to control the switches $SW_1$ and $SW_3$.

When the battery voltage $V_B$ is higher than a threshold value, the control module 404 utilizes the control components $S_1 \sim S_6$ to turn off the switches $SW_3 \sim SW_6$ and to turn on the switches $SW_1$ and $SW_2$. Therefore, the charge module 416 provides the voltage $V_1$ to the pin D+ and the charge module 418 provides the voltage $V_2$ to the pin D−. Since the pin D+ receives the voltage $V_1$ and the pin D− receives the voltage $V_2$, the external device 104 enters a fast charge mode. At this time, the detection module 402 detects the voltage levels of the pins D+ and D−. The control module 404 determines whether to turn on the switches $SW_1$ and $SW_2$ according to the detection result generated by the detection module 402.

In one embodiment, when the voltage levels of the pins D+ and D− conform to a pre-determined state, the control module 404 still turns on the switches $SW_1$ and $SW_2$ to continuously provide the voltages $V_1$ and $V_2$. Therefore, the external device 104 still operates in the fast charge mode. However, when the voltage levels of the pins D+ and D− do not conform to the pre-determined state, the control module 404 turns on the switches $SW_3$ and $SW_4$ and turns off the switches $SW_1 \sim SW_2$ and $SW_5 \sim SW_6$ such that the pin D+ is connected to the pin D−.

When the battery voltage $V_B$ is not higher than the threshold value, the control module 404 utilizes the control components $S_1 \sim S_6$ to turn on the switches $SW_5$ and $SW_6$ and turn off the switches $SW_1 \sim SW_4$. Therefore, the charge unit 422 provides the voltage $V_3$ to the pin D+ and the charge unit 424 provides the voltage $V_4$ to the pin D−. Since the pin D+ receives the voltage $V_3$ and the pin D− receives the voltage $V_4$, the external device 104 enters a slow charge mode and captures a small charge current from the charge device 102. Therefore, the battery voltage $V_B$ of the battery unit disposed in the charge device 102 is gradually reduced.

Figure 5:
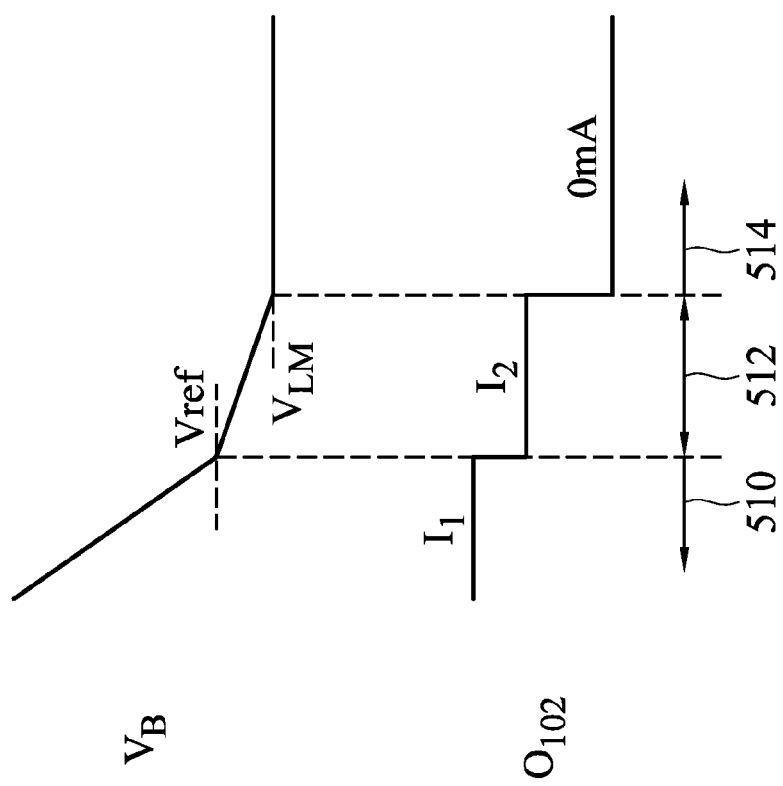
FIG. 5 is a schematic diagram of a battery voltage, in accordance with some embodiments.

FIG. 5 is a schematic diagram of a battery voltage, in accordance with some embodiments. Refer to FIGS. 1 and 5, during period 510, since the battery voltage $V_B$ is higher than a threshold value Vref, the control module 124 directs the pins D+ and D− to connect to the charge unit 128. The external device 104 operates in a fast charge mode according to the states of the pins D+ and D− and captures a large charge current from the charge device 102.

During period 512, the battery voltage $V_B$ is not higher than the threshold value Vref such that the control module 124 directs the pins D+ and D− to connect to the charge unit 130. The external device 104 operates in a slow charge mode according to the states of the pins D+ and D− and captures a small charge current (e.g. $I_2$) from the charge device 102.

During period 514, the battery voltage $V_B$ is not higher than the limiting value $V_{LM}$ such that the control module 124 de-asserts the control signal $S_{C1}$ to stop providing the charge voltage $V_T$ to the external device 104.

Since the charge device 102 provides the appropriate charge current to the external device 104 according to the internal battery voltage $V_B$, when the battery voltage $V_B$ is low, the charge device 102 changes the pin state of the connection port 108 to provide a small charge current to effectively use the battery voltage $V_B$.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charge device coupling to an external device, comprising:
   a connection port configured to couple to the external device and comprising a first pin and a second pin;
   a battery unit having a battery voltage;
   a conversion unit converting the battery voltage to provide power to the external device; and
   a detection control unit directing the first and second pins to couple to a first charge unit when the battery voltage is higher than a threshold value, and directing the first and second pins to couple to a second charge unit when the battery voltage is not higher than the threshold value;
   wherein when the first and second pins are coupled to the first charge unit, the connection port outputs a first charge current to the external device, when the first and second pins are coupled to the second charge unit, the connection port outputs a second charge current to the external device, and the first charge current is greater than the second charge current.

2. The charge device as claimed in claim 1, wherein the first charge unit directs the first pin to connect to the second pin.

3. The charge device as claimed in claim 1, wherein the first charge unit executes a first operation for the battery voltage to generate a first voltage to the first pin and generate a second voltage to the second pin.

4. The charge device as claimed in claim 1, wherein the first charge unit comprises:
   a first charge module directing the first pin to connect to the second pin; and
   a second charge module processing the battery voltage to generate the first and second voltages,
   wherein the detection control unit directs the first pin to couple to the second charge module and detects a level of the first pin, when the voltage level of the first pin conforms to a pre-determined state and the battery voltage is higher than the threshold value, the detection control unit directs the first and second pins to remain coupled to the second charge module, and when the voltage level of the first pin does not conform to the pre-determined state and the battery voltage is not higher than the threshold value, the detection control unit directs the first and second pins to couple to the first charge module.

5. The charge device as claimed in claim 1, wherein the second charge unit provides a third voltage to the first pin and provides a fourth voltage to the second pin.

6. The charge device as claimed in claim 5, wherein the second voltage is within 0V~5V.

7. The charge device as claimed in claim 5, wherein the second charge unit is a resistor generating the second voltage according to a ground voltage.

8. The charge device as claimed in claim 1, wherein when the battery voltage is not higher than the threshold voltage, the detection control unit first de-activates the conversion unit and then activates the conversion unit, and when the conversion unit is de-activated, the conversion unit stops converting the battery voltage.

9. The charge device as claimed in claim 1, wherein when the battery voltage is not higher than the threshold voltage and a limiting value, the detection control unit de-activates the conversion unit to stop converting the battery voltage.

10. The charge device as claimed in claim 1, wherein the connection port is a USB port.

11. A charge system comprising:
    a charge device providing a first charge current or a second charge current and comprising:
      a connection port comprising a first pin and a second pin;
      a battery unit having a battery voltage;
      a conversion unit converting the battery voltage; and
      a detection control unit directing the first and second pins to couple to a first charge unit when the battery voltage is higher than a threshold value, and directing the first and second pins to couple to a second charge unit when the battery voltage is not higher than the threshold value;
      wherein when the first and second pins are coupled to the first charge unit, the connection port outputs the first charge current, when the first and second pins are coupled to the second charge unit, the connection port outputs the second charge current, and the first charge current is greater than the second charge current; and
    an external device coupled to the connection port to receive the first or second charge current.

12. The charge system as claimed in claim 11, wherein the first charge unit directs the first pin to connect to the second pin.

13. The charge system as claimed in claim 11, wherein the first charge unit executes a first operation for the battery voltage to generate a first voltage to the first pin and generate a second voltage to the second pin.

14. The charge system as claimed in claim 11, wherein the first charge unit comprises:
    a first charge module directing the first pin to connect to the second pin; and
    a second charge module processing the battery voltage to generate the first and second voltages,
    wherein the detection control unit directs the first pin to couple to the second charge module and detects a level of the first pin, when the voltage level of the first pin conforms to a pre-determined state and the battery voltage is higher than the threshold value, the detection control unit directs the first and second pins to remain coupled to the second charge module, and when the voltage level of the first pin does not conform to the pre-determined state and the battery voltage is not higher than the threshold value, the detection control unit directs the first and second pins to couple to the first charge module.

15. The charge system as claimed in claim 11, wherein the second charge unit provides a third voltage to the first pin and provides a fourth voltage to the second pin.

16. The charge system as claimed in claim 15, wherein the second voltage is within 0V~5V.

17. The charge system as claimed in claim 15, wherein the second charge unit is a resistor generating the second voltage according to a ground voltage.

18. The charge system as claimed in claim 11, wherein when the battery voltage is not higher than the threshold voltage, the detection control unit first de-activates the conversion unit and then activates the conversion unit, and when the conversion unit is de-activated, the conversion unit stops converting the battery voltage.

19. The charge system as claimed in claim 11, wherein when the battery voltage is not higher than the threshold voltage and a limiting value, the detection control unit de-activates the conversion unit to stop converting the battery voltage.

20. The charge system as claimed in claim 11, wherein the connection port is a USB port.

* * * * *